United States Patent [19]

Frank et al.

[11] 4,272,420
[45] Jun. 9, 1981

[54] AQUEOUS POLYESTER EMULSIONS AND THE USE THEREOF FOR THE PRODUCTION OF PARTICULARLY THIN-LAYER COATINGS

[75] Inventors: Walter Frank; Otto Bendszus; Hans-Joachim Freier; Hans-Joachim Traenckner, all of Krefeld, Fed. Rep. of Germany

[73] Assignee: Bayer Aktiengesellschaft, Fed. Rep. of Germany

[21] Appl. No.: 120,576

[22] Filed: Feb. 11, 1980

[30] Foreign Application Priority Data

Feb. 14, 1979 [DE] Fed. Rep. of Germany ....... 2905666

[51] Int. Cl.$^3$ ................................................ C08K 5/01
[52] U.S. Cl. .............................. 260/28 R; 260/29.2 E
[58] Field of Search ......... 260/28 R, 29.2 E, 29.2 UA

[56] References Cited

U.S. PATENT DOCUMENTS

| 4,133,787 | 1/1979 | Laganis | 260/29.2 E |
| 4,154,709 | 5/1979 | Ukita | 260/29.2 E |
| 4,179,420 | 12/1979 | Laganis | 260/29.2 E |

*Primary Examiner*—Paul R. Michl
*Attorney, Agent, or Firm*—Connolly and Hutz

[57] ABSTRACT

Paraffin-containing monomer-free aqueous emulsions of a mixture comprising two unsaturated polyesters, of which one contains α,γ-unsaturated ether groups, but no co-condensed residues of higher polyalkylene glycols, while the other contains co-condensed residues of higher polyalkylene glycols and monofunctional alcohols and/or carboxylic acids, but no α,γ-unsaturated ether groups, are eminently suitable for the production of extremely thin-layer coatings without levelling faults.

10 Claims, No Drawings

AQUEOUS POLYESTER EMULSIONS AND THE USE THEREOF FOR THE PRODUCTION OF PARTICULARLY THIN-LAYER COATINGS

This invention relates to aqueous emulsions based on unsaturated polyesters for the production of particularly thin-layer coatings on wood, wood-like materials or wood imitations (e.g. grain printing or decorative films).

In the manufacture of furniture, thin-layer coatings are applied, inter alia, by casting on to chipboards pretreated by smoothing and grain printing (wood imitation) as the final step of the lacquering process. Very thin coatings are required in particular for so-called "open-pore lacquering".

An open-pore coating is to be understood to be a thin-layer (generally mat) lacquer coating in which the sealed lacquer film is closely adapted to the pore structure and grain of wood, the natural appearance of the wood surface remaining intact. Open-pore coatings are generally used for lacquering furniture. The coating compositions normally used are nitrocellulose lacquers of which the lacquer films which are only physically dried do not have sufficient resistance to solvents. This disadvantage is avoided by using coating compositions based on unsaturated polyesters.

Thin-layer or open-pore coatings may be produced from unsaturated polyester resins of high monomer content, the lacquer being characterized by a high degree of thixotropy (German Offenlegungsschrift No. 2,623,960). During hardening of the film, the styrene which is almost exclusively used as monomer in lacquers of this type copolymerises with the unsaturated polyesters so that cross-linked, i.e. insoluble, lacquer films of high utility value are formed by comparison with nitrocellulose lacquering. However, evaporation losses of monomeric styrene during processing, for example in the casting machine and at the beginning of the film hardening process, are unavoidable. The removal thereof from the waste air of the production shops and drying installations is extremely expensive on account of the very large quantities of air which have to be circulated.

An object of the present invention is to provide coating compositions based on unsaturated polyesters for particularly thin coatings on wood, wood-like materials or wood imitations which do not have the disadvantages referred to above and which do not show levelling faults, particularly when applied in extremely thin layers.

It is known from British Patent No. 1,076,319 that polyesters containing terminally co-condensed polyalkylene glycol units may be used as emulsifiers for the production of water-in-oil emulsions on the basis of unsaturated (monomer-containing)polyesters and/or polymerisable monomers and inert organic solvents. The emulsions obtained may be used for the production of lubricants, hydraulic fluids or polymers.

It has now surprisingly been found that monomer-free aqueous emulsions containing sealing agents and consisting of a mixture of at least two $\alpha,\beta$-ethylenically unsaturated polyesters, of which one contains $\beta,\gamma$-ethylenically unsaturated ether groups, but no co-condensed residues of higher polyalkylene glycols, whilst the other contains co-condensed residues of higher polyalkylene glycols and monofunctional alcohols and/or carboxylic acids, but no $\beta,\gamma$-ethylenically unsaturated ether groups, are eminently suitable for the production of extremely thin-layer coatings without levelling faults.

It was particularly surprising to find that the polyesters containing polyalkylene oxide residues which cannot be hardened in the absence of copolymerisable monomers may be hardened in the presence of polyesters containing $\beta,\gamma$-ethylenically unsaturated ether groups and in the absence of monomers to form scratch-resistant and waterproof coatings.

Accordingly, the present invention relates to monomer-free aqueous emulsions comprising:
A. from 10 to 90%, by weight, preferably from 35 to 70%, by weight, of mixtures of $\alpha,\beta$-ethylenically unsaturated polyesters;
B. from 9.95 to 83%, by weight, preferably from 29.95 to 78%, by weight, of water;
C. from 0.05 to 2%, by weight, of a sealing agent; and, optionally,
D. up to 5%, by weight, of a thickener; the percentages, by weight, being based in each case on the sum of components (A), (B), (C) and (D), characterised in that the polyester mixture (A) comprises:
  (a) from 50 to 95%, by weight, preferably from 70 to 90%, by weight, based on the sum of (a) and (b), of at least one $\alpha,\beta$-ethylenically unsaturated polyester which contains per 100 g of polyester a from 0.2 to 0.8, preferably from 0.3 to 0.7 mole, of $\beta,\gamma$-ethylenically unsaturated ether groups, but no co-condensed polyalkylene glycol residues having a molecular weight of from 250 to 2000; and
  (b) from 5 to 50%, by weight, preferably from 10 to 30%, by weight, based on the sum of (a) and (b), of at least one $\alpha,\beta$-ethylenically unsaturated polyester of which from 25 to 90%, by weight, preferably from 30 to 80%, by weight, based on (b), consists of co-condensed polyalkylene glycol residues having a molecular weight of from 250 to 2,000, preferably from 300 to 1,000, and which per 100 g of polyester (b) contains from 0.02 to 0.2, preferably from 0.07 to 0.14, mole of saturated aliphatic terminal groups, preferably branched, containing from 6 to 18, preferably from 6 to 12, carbon atoms which are residues of monocarboxylic acids and/or, preferably, monofunctional alcohols.

The present invention also relates to a process for the production of thin-layer coatings in which the monomer-free aqueous emulsions according to the present invention are provided with a hardening catalyst and applied to wood or a wood-like substrate in quantities corresponding to a dry film thickness of up to 100 $\mu$m, preferably up to 30 $\mu$m, the water is evaporated off at temperatures of from 20° to 150° C., preferably 40° to 100° C., the coating thus applied to the substrate is hardened at the same temperature or at a higher temperature, i.e. at a temperature of from 20° to 180° C., preferably from 40° to 160° C., or by exposure to UV-radiation until the substrate may be stacked.

The present invention also relates to the use of the present emulsions for the production of lacquers, particularly for thin-layer coatings.

In the context of the present invention, the expression "monomer-free" means free from monomers which would be copolymerisable with the unsaturated polyesters (a) and (b).

The process according to the present invention avoids the levelling faults in the lacquer film formed which are so difficult to influence in the case of aqueous emulsions and, through the absence of evaporating organic solvents and monomers, enables in-layer coatings to be prepared under more pleasant conditions. The lacquer films show satisfactory flow properties, even when applied in quantities corresponding to dry film thicknesses of 10 μm.

Preferred $\alpha,\beta$-ethylenically unsaturated polyesters (a) are the polycondensation products of at least one $\alpha,\beta$-ethylenically unsaturated dicarboxylic acid generally containing 4 or 5 carbon atoms or ester-forming derivatives thereof (for example anhydrides), optionally in admixture with up to 100 mole percent, based on the unsaturated acid component, of at least one aliphatic saturated dicarboxylic acid containing from 4 to 10 carbon atoms or of a cycloaliphatic or aromatic dicarboxylic acid containing from 8 to 10 carbon atoms or ester-forming derivatives thereof (for example anhydrides), with at least one hydroxy compound, preferably a polyhydroxy compound containing from 2 to 8 carbon atoms, of which the OH groups which are not used for the polycondensation reaction are at least partly etherified with $\beta,\gamma$-unsaturated alcohols, i.e. polyesters of the type described, for example, in German Auslegeschrift No. 1,024,654.

Examples of the unsaturated dicarboxylic acids or derivatives thereof which are preferably used in accordance with the present invention are maleic acid, maleic acid anhydride and fumaric acid. However, it is also possible to use, for example, mesaconic acid, citraconic acid, itaconic acid or chloromaleic acid. Examples of the aliphatic saturated and cycloaliphatic and aromatic dicarboxylic acids or derivatives thereof which may be used in accordance with the present invention are phthalic acid or phthalic acid anhydride, isophthalic acid, terephthalic acid, hexahydro- or tetrahydrophthalic acid or anhydrides thereof, endomethylene tetrahydrophthalic acid or the anhydride thereof, succinic acid or succinic acid anhydride and succinic acid esters and chlorides, adipic acid or sebacic acid. In order to produce flame-resistant resins, it is possible to use, for example, hexachloroendomethylene tetrhydrophthalic acid, tetrachlorophthalic acid or tetrabromophthalic acid. Suitable dihydric alcohols include: ethylene glycol, 1,2-propane diol, 1,3-propane diol, diethylene glycol, dipropylene glycol, 1,3-butane diol, 1,4-butane diol, neophentyl glycol, 1,6-hexane diol, 2,2-bis-(4-hydroxy cyclohexyl)-propane, bis-alkoxylated bisphenol A and perhydro bisphenol. It is preferred to use ethylene glycol, 1,2-propane diol, diethylene glycol, and dipropylene glycol.

In addition to the above-mentioned dicarboxylic acid residues of the polyesters (a), the $\alpha,\beta$-ethylenically unsaturated polyesters (b) contain residues of at least one aliphatic monohydroxy compound or monocarboxylic acid and at least one polyhydroxy compound containing from 2 to 8 carbon atoms, of which at least one polyhydroxy compound contains incorporated polyalkylene oxide residues having a molecular weight of from 250 to 2000.

Preferred saturated aliphatic monofunctional alcohols are alkanols, cycloalkanols and cycloalkane alkanols, for example, n-hexanol, n-octanol, n-decanol, laurol, stearyl alcohol, hexahydrobenzyl alcohol, preferably branched alkanols, such as 2-ethyl-1-hexanol and isononanols. Preferred saturated aliphatic monocarboxylic acids are n-octanoic, n-dodecanoic and stearic acid, preferably 2-ethyl-hexanoic acid and isononanoic acid. Preferred polyhydroxy compounds are the diols mentioned above for the production of polyester (a), for example, ethylene glycol, diethylene glycol, 1,2- and 1,3-propane diol, 1,3- and 1,4-butane diol, 2-ethyl-1,3-propane diol, 1,6-hexane diol. Higher polyhydroxy compounds can only be used in small quantities on account of the branching effect thereof. In this context, "aliphatic" also includes "cycloaliphatic".

The polyalkylene oxide residues may be co-condensed in known manner through polyalkylene glycol during the production of the polyester or, as described in British Patent No. 1,076,319, by addition of the corresponding alkylene oxides with the OH or COOH-groups or a polyester precursor. However, mixed polyalkylene glycol residues are also suitable, for example ethylene oxide/propylene oxide mixed ethers having propylene oxide contents of less than 50 mole percent. Preferred polyalkylene glycols are those in which the oxygen atoms are separated by at least 2 carbon atoms, particularly by from 2 to 4 carbon atoms. Particularly preferred polyalkylene glycols are polyethylene glycols.

The polyesters should have acid numbers of from 1 to 40, preferably from 10 to 30, OH-numbers of from 10 to 120, preferably from 30 to 80, and molecular weights determined as number averages of from 300 to 5000, preferably from 500 to 2000.

In order to protect the emulsions according to the present invention against undesirable premature polymerisation, it is advisable to add from 0.001 to 0.1%, by weight, based on component (A), of polymerisation inhibitors or oxidation inhibitors during the actual production of the unsaturated polyesters.

Preferred auxiliaries of this type are, for example, phenols and phenol derivatives, preferably sterically hindered phenols which contain alkyl substituents having from 1 to 6 carbon atoms in both o-positions to the phenolic hydroxy group, amines, preferably secondary aryl amines and derivatives thereof, quinones, copper salts of organic acids, addition compounds of copper (1) halides with phosphites; compounds of the type described in "Methoden de organischen Chemie" (Houben-Weyl), 4th Edition, Vol XIV/1, pages 443–452, 756, Georg-Thieme-Verlag, Stuttgart, 1961. Hydroquinone and p-benxoquinone, for example, are particularly suitable, being used in concentrations of 0.05% and 9.5%, by weight, respectively, based on component (A). Preferred sealing agents (C) are waxes and, preferably, paraffins having a melting point of from 35° to 100° C., preferably from 40° to 80° C. They are preferably added to the emulsions according to the present invention in the form of aqueous dispersions and prevent the polymerisation reaction from being inhibited by atmospheric oxygen.

Thickeners, (D), which are necessary above all for thinly liquid oil-in-water emulsions for producing the necessary processing viscosity of the emulsions according to the present invention, are described in Karsten, Lackrohstofftabellen, 6th Edition 1976, Paragraph 42.28 "Verdickungsmittel". Preferred thickeners are cellulose derivatives, for example methyl cellulose, thickeners based on urethanes and also certain montmorillonites. They may either be added to the polyester mixture or to the water before emulsification or may be subsequently stirred into the finished emulsion for after-thickening.

The emulsion according to the present invention may be produced by stirring the water (B) into the polyester mixture (A), for example by simple stirring or by means of a dissolver. In order to form a more finely divided emulsion, i.e. to enable the shear forces to be better introduced, it is of advantage to add water in portions at temperatures below 30° C. Both water-in-oil and also oil-in-water emulsions are formed.

Hardening may be carried out in known manner using polymerisation-initiating radical formers (cf. for example Wagner/Sarx, Lackkunstharze, Chapter entitled "Ungesattigte Polyesterharze (Unsaturated Polyester Resins)" 5th Edition, Carl Hanser Verleg, Stuttgart, 1971). It is preferred to use water-soluble peroxides, such as hydrogen peroxide and acetyl acetone peroxide, also methyl ethyl ketone hydroperoxide, cyclohexanone hydroperoxide or aqueous emulsions of the water-insoluble initiators. Preferred accelerators are, for example, the heavy metal salts of carboxylic acids or the chelates of these metals, such as the acetates, naphthanates or acetyl acetonates of cobalt, manganese or vanadium. The accelerators may also be added either in the form of aqueous solutions where they are soluble in water or in the form of aqueous emulsions.

Conventional quantities, e.g. from 0.5 to 5%, by weight, of peroxide, from 0.01 to 0.2%, by weight, of metal siccative, based on component (A), generally ensure excellent hardening.

Hardening using UV-rays in the presence of the known initiators (H. G. Heine et al, Aromatische Ketonverbindungen als Initiatoren by Photopolymerisationen (Aromatic Ketone Compounds as Initiators for Photopolymerisation Reactions), Angew. Chem. A 84/1972, pages 1032–1036) may only be carried out after the water present in the lacquer film has been removed.

In order to protect light-sensitive substrates, for example light-coloured woods, small quantities of the conventional UV-absorbers, for example 2-hydroxy-4-methoxy benzophenone, or the cinnamic acid and benzotriazine derivatives normally used, may be added to the coating compositions.

Conventional additives and dyes, preservatives, matting agents, levelling agents and pigments may also be added to obtain particular effects providing they do not significantly affect the stability of the emulsion and the polymerisation reaction.

Lacquers produced from the emulsions according to the present invention are eminently suitable for processing on conventional lacquering lines equipped with casting machines, for example by the active primer process (cf. German Auslegeschrift No. 1,025,302), and also for casting in catalysed and siccativated form by virtue of the long open processing times.

In addition, the lacquers produced from the emulsions according to the present invention may also be applied by roll-coating and spray-coating using known methods (Wagner/Sarx, Lackkunstharze, 5th Edition, Carl Hanser Verlag, 1971, pages 140 and 141, and Weigel, Katalytische Lackkartung und ihre Rohstoffe, (Catalytic Lacquer Hardening and Starting Materials Therefor), Wissenschaftliche, Verlagsgesellschaft, 1962, pages 192 to 202.

The present invention is illustrated by the following Examples.

EXAMPLES

Polyesters having the following composition (in moles) and characteristics were used in the emulsions according to the present invention:

| Polyester (a) | $a_1$ | $a_2$ | $a_3$ | $a_4$ |
|---|---|---|---|---|
| Maleic acid anhydride | 1.0 | 0.67 | 1.0 | 1.0 |
| Adipic acid | — | 0.33 | — | — |
| 1,2-propane diol | 0.55 | 0.55 | 0.55 | — |
| 2-ethyl-1,3-propane diol | — | — | — | 0.51 |
| Benzyl alcohol | 0.5 | — | — | — |
| Trimethylol propane dillyl ether | 0.5 | 1.0 | 1.0 | 1.0 |
| Acid number | 22 | 16 | 20 | 10 |
| Viscosity [mPa.s], as measured on a 70%, by weight, solution in styrene at 20° C. | 316 | 110 | 120 | 141 |

| Polyester (b) | $b_1$ | $b_2$ | $b_3$ | $b_4$ | $b_5$ |
|---|---|---|---|---|---|
| Maleic acid anhydride | 1.0 | 1.0 | 1.0 | 1.0 | 1.0 |
| 2-ethyl hexanoic acid | — | — | — | — | 0.6 |
| Polyethylene glycol (MW 400) | 0.86 | 0.86 | 0.86 | 0.86 | 1.5 |
| 2-ethyl-1-hexanol | 0.47 | — | — | — | — |
| n-octanol | — | 0.43 | — | — | — |
| Trimethyl-1-hexanol (mixture of 2,4,4,- and 3,5,5-isomers approximately 1:1) | — | — | 0.43 | — | — |
| n-dodecyl alcohol | — | — | — | 0.43 | — |
| Acid number | 18 | 12 | 12 | 13 | 5 |
| Viscosity [mPa.s] | 3000 | 3900 | crystal sludge | 7050 | 2200 |

Composition and production of the emulsions according to the present invention (in parts, by weight):

| Example No. | 1 | 2 | 3 | 4 | 5 | 6 |
|---|---|---|---|---|---|---|
| Polyester | | | | | | |
| $a_1$ | 80 | | | | | |
| $a_2$ | | | | 80 | | |
| $a_3$ | | | 80 | | | 80 |
| $a_4$ | | 82 | | | 80 | |
| $b_1$ | 20 | 18 | | | | |
| $b_2$ | | | 20 | | | |
| $b_3$ | | | | 20 | | |
| $b_4$ | | | | | 20 | |
| $b_5$ | | | | | | 20 |
| Water | 100 | 100 | 100 | 100 | 100 | 100 |
| Thickener | — | 2 | — | — | 2 | — |
| Sealing agent dispersion | 4 | 4 | 4 | 4 | 4 | 4 |

To prepare the emulsions, the polyester mixtures (a)+(b) were emulsified with water for a solids content of 70%, by weight, in a dissolver (8000 rpm.) at temperatures up to a maximum of 40° C. and subsequently diluted with water or a water/thickener mixture at 1000 rpm. to a solids content of 50%, by weight.

Thickener: Montmorillonite derivative

Sealing agent dispersion: 10 parts, by weight of paraffin (Mp. 57°–60° C.) emulsified in 90 parts, by weight, of a 6%, by weight aqueous polyvinyl alcohol solution (polyvinyl alcohol:saponification number 140, viscosity: 25 mPa.s, as measured on a 4%, by weight, aqueous solution at 20° C.).

The sealing agent dispersion was added to the above-mentioned emulsions which were catalysed with 3%, by weight of $H_2O_2$ (35%, by weight) and siccativated with a 2%, by weight, aqueous Co-acetate solution (approximately 5%, by weight, of metal) and, to test levelling, were drawn onto glass plates in such a way that dry film thicknesses of from 10 to 20 μm were obtained. Satisfactorily levelling, crater-free, highly scratch-resistant lacquer films are obtained, even where hardening is carried out at room temperature.

We claim:

1. A monomer-free aqueous emulsion of (A) from 10 to 90% by weight of a mixture of α,β-ethylenically unsaturated polyesters;
(B) from 9.95 to 83% by weight of water;
(C) from 0.05 to 2% by weight of a sealing agent and
(D) 0 to 5% by weight of a thickener; the percentages by weight being based in each case on the sum of (A), (B), (C) and (D), and said polyester mixture (A) containing:
  (a) from 50 to 95% by weight, based on the sum of (a) and (b), of at least one α,β-ethylenically unsaturated polyester which, per 100 g of polyester (a), contains from 0.2 to 0.8 moles of β,γ-ethylenically unsaturated ether groups but is free of co-condensed polyalkylene glycol residues having a molecular weight of 250 to 2000 and
  (b) from 5 to 50% by weight based on the sum of (a) and (b) of at least one α,β-ethylenically unsaturated polyester of which 25 to 90% by weight based on (b) consists of co-condensed glycol residues having a molecular weight of from 250 to 2000 and which contains, per 100 g of polyester (b), 0.02 to 0.2 mole of saturated aliphatic terminal groups which are residues of at least one member selected from the group consisting of monocarboxylic acids and monofunctional alcohols.

2. An emulsion as claimed in claim 1 containing
(A) from 35 to 70% by weight of a mixture of α,β-ethylenically unsaturated polyesters;
(B) from 29.95 to 78% by weight of water;
(C) from 0.05 to 2% by weight of a sealing agent and
(D) up to 5% by weight of a thickener.

3. An emulsion as claimed in claim 1 or 2 wherein 70 to 90% by weight of the polyester mixture (A) consists of polyester (a) and from 10 to 30% by weight of polyester (b).

4. An emulsion as claimed in claim 1 wherein 100 g of polyester (a) contains from 0.3 to 0.7 mole of β,γ-ethylenically unsaturated ether groups.

5. An emulsion as claimed in claim 1 wherein 30 to 80% by weight of polyester (b) consists of co-condensed polyethylene glycol residues having a molecular weight of 250 to 1000.

6. An emulsion as claimed in claim 1 wherein the polyalkylene glycol residue is polyethylene glycol residue.

7. An emulsion as claimed in claim 1 wherein 100 g of polyester (b) contains from 0.07 to 0.14 mole of saturated aliphatic terminal groups.

8. An emulsion as claimed in claim 1 wherein the saturated aliphatic terminal groups of polyester (b) contain from 6 to 18 carbon atoms.

9. A process for producing a thin-layer coating on a wood or a wood-like substrate which comprises applying a monomer-free aqueous emulsion of claim 1 in the presence of a hardening catalyst to said substrate in a quantity corresponding to a dry film thickness of up to 100 μm, predrying at a temperature of from 20° to 150° C. and hardening at said temperature or a higher temperature or by means of UV-radiation.

10. A lacquer suitable for thin-layer coatings comprising a monomer-free aqueous emulsion of claim 1.

* * * * *